Figure 3:
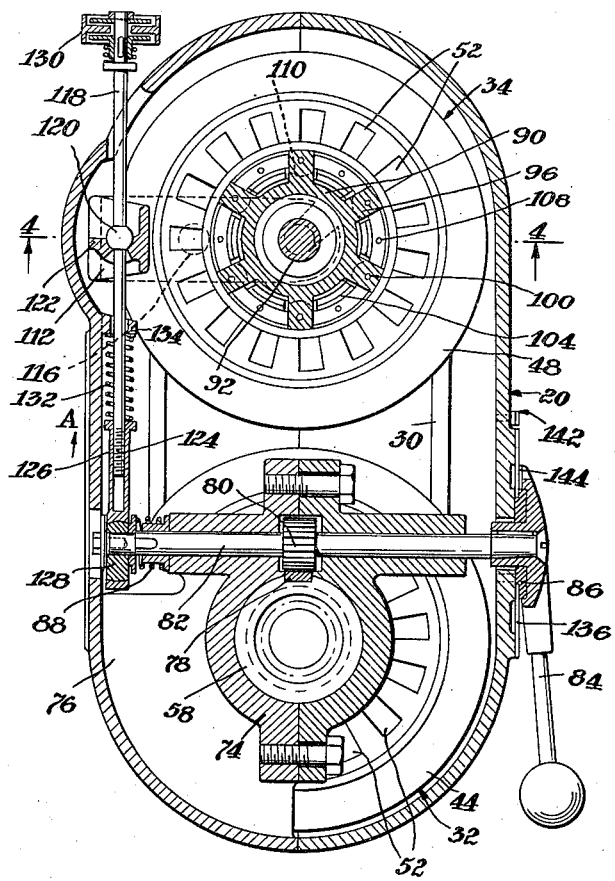

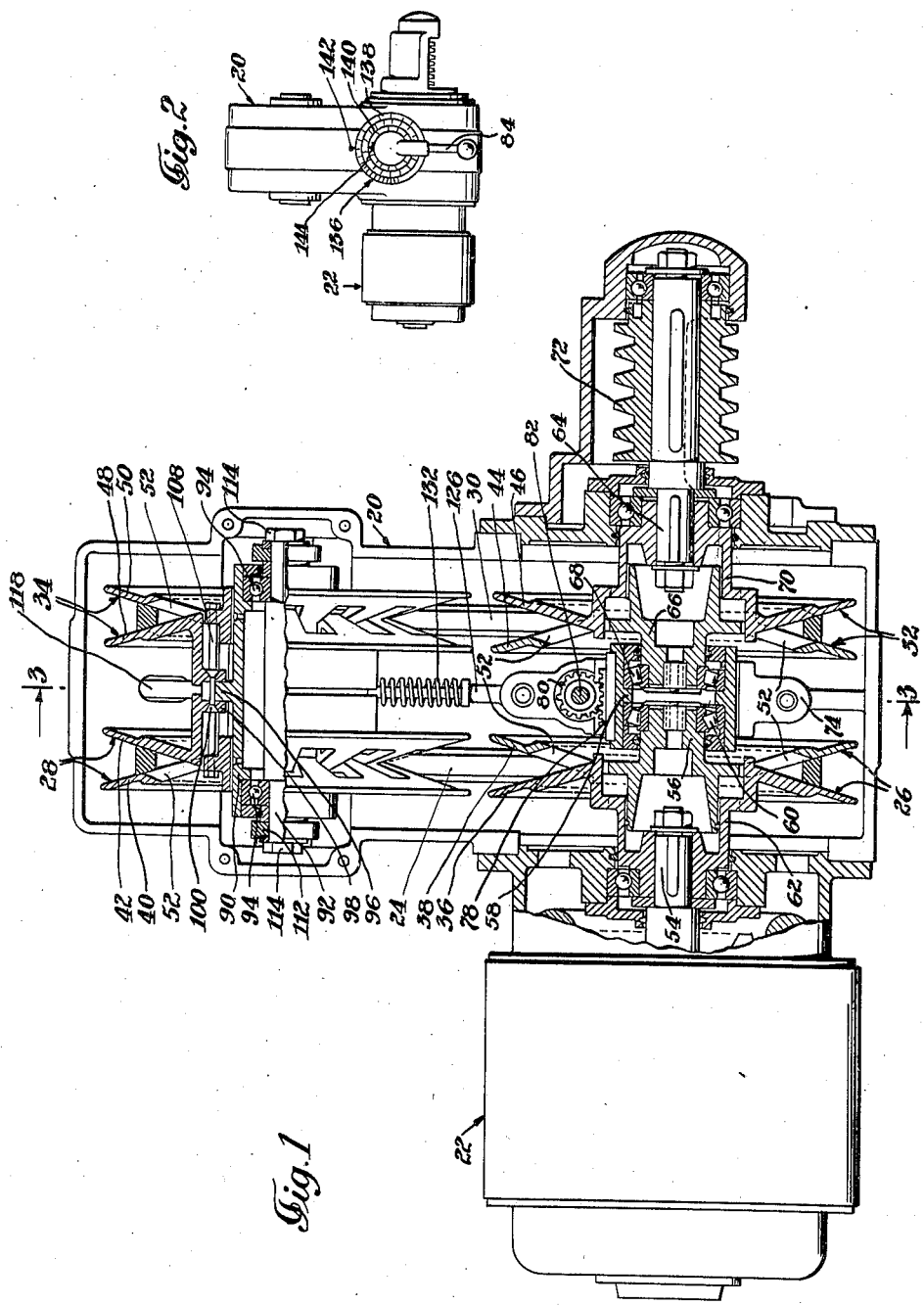

May 16, 1944. W. VOEGELI 2,348,940
STEPLESS CHANGE SPEED TRANSMISSION
Filed Jan. 31, 1942 3 Sheets-Sheet 2

INVENTOR:
Walter Voegeli
BY
ATTORNEY.

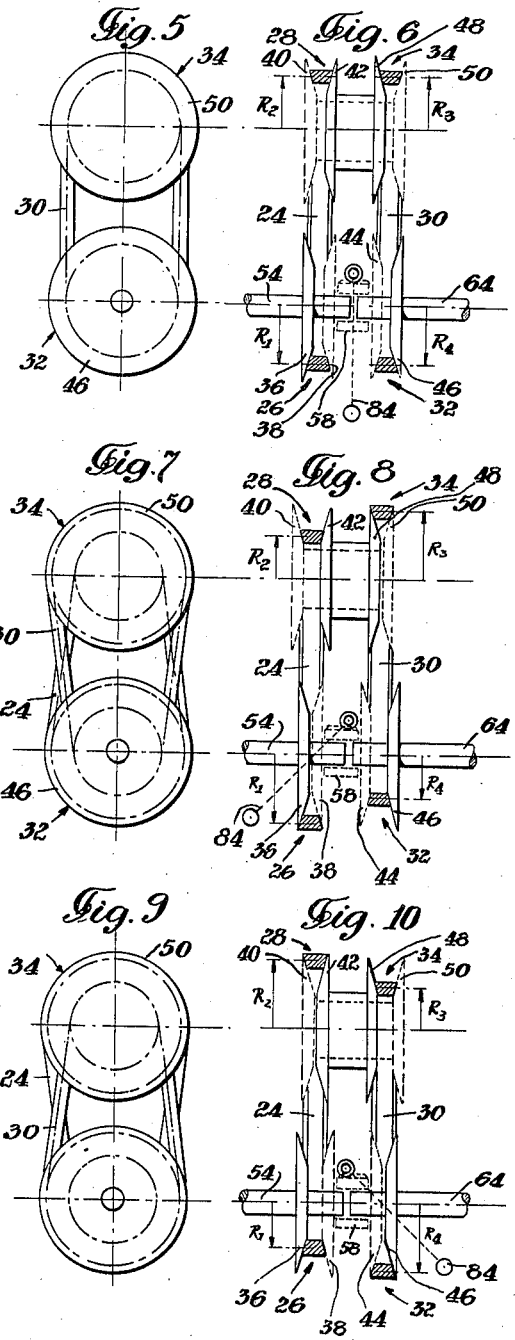

Patented May 16, 1944

2,348,940

UNITED STATES PATENT OFFICE 2,348,940

STEPLESS CHANGE SPEED TRANSMISSION

Walter Voegeli, Rio de Janeiro, Brazil

Application January 31, 1942, Serial No. 429,009

9 Claims. (Cl. 74—230.17)

My invention relates to transmissions, and more particularly to a stepless change speed transmission.

Most of the hitherto known stepless change speed transmissions are of the so-called "Reeves-drive" type, wherein the output of the incoming-power shaft is transmitted to the outgoing-power shaft by means of a single wedge-shaped belt of especially great width trained around two variable conical disc pulleys, each of which is composed of a pair of cones adjustably arranged with respect to each other. The incoming-power shaft is driven by the driving means, for example an electro-motor, at a constant number of revolutions, and the number of revolutions of the outgoing-power shaft coupled with the mechanism to be driven may be varied by an adjustment of the conical disc pulleys. It has been found, however, that the permissible maximal speed of the belt of stepless change speed transmissions of this type is comparatively low. Therefore it is necessary to provide for speed reduction gears between the shaft of the driving motor and the incoming-power shaft of the stepless change speed transmission, so that a direct coupling of the transmission with the shaft of the motor is impossible and the transmission cannot be directly mounted on the casing of the motor. Furthermore, an attachment of the transmission to the machine to be driven is rendered difficult owing to the rather bulky and voluminous construction of the transmission of that type.

It has also been proposed to replace Reeves' belt of especially great width by a conventional wedge-shaped belt of standard width in stepless change speed transmissions of above described type. In such a case, however, the two cones of each conical disc must be provided with radial openings for permitting an intermeshing of the cones.

Furthermore, there are stepless change speed transmissions on the market, which are entirely different from the so-called "Reeves-drives." These transmissions have to be arranged between the driving motor and the driven machine in such a way, that the shaft of the transmission is in a plane parallel to the shafts of the motor and the machine, so that a comparatively great distance between the shaft of the motor and the shaft of the machine is required. The transmissions comprise two variable conical disc pulleys which are arranged on one and the same shaft. An adjustment of the variable conical disc pulleys for a variation in the number of revolutions of the driven machine may be carried out by means of a hand lever. The hand lever causes an approaching to each other of the two cones of one variable disc pulley and a separating from each other of the two cones of the other variable disc pulley, and, at the same time, the shaft of the transmission is swung toward the machine in case of an increase of the number of revolutions of the machine, or the shaft is swung toward the motor in case of a decrease of the number of revolutions of the machine. An invariable conical pulley secured to the shaft of the motor is connected with one of said variable conical disc pulleys of the transmission by means of a first standard wedge-shaped belt, and the other variable conical disc pulley is connected with an invariable conical disc pulley on the main shaft of the machine by means of a second standard wedge-shaped belt.

In the hitherto known stepless change speed transmissions of above described types, the ratio of the maximal number of revolutions of the driven outgoing-power shaft to the minimal number of revolutions of said shaft is equal to the square of the ratio of the maximal effective diameter of the variable conical disc pulleys to the minimal effective diameter of said pulleys, i. e.:

$$\frac{n_1 \text{ max.}}{n_1 \text{ min.}} = \left(\frac{D \text{ max.}}{D \text{ min.}}\right)^2$$

Therefore, the variable conical disc pulleys of the hitherto known transmissions are of comparatively large diameter, as the permissible minimal diameter of the pulleys is limited by the size of the belts used.

One object of my invention is to provide a stepless change speed transmission with belt drive, which has conical disc pulleys of comparatively small diameter and provides for a great ratio of the number of revolutions of the incoming-power shaft to the number of revolutions of the outgoing-power shaft.

Another object of my invention is to provide a stepless change speed transmission with variable conical disc pulleys and belt drive, which, in comparison with conventional transmissions of this type, has a capacity equal or superior to the capacity of said conventional transmissions, and which not only may be directly attached to the motor but also has the advantage of requiring only a minimum of space owing to its compact construction.

According to my invention the output of the shaft of the motor rotating at a constant number of revolutions is transmitted to the outgoing-power shaft of the transmission by two standard wedge-shaped belts of equal dimensions. Each belt is trained around two variable conical disc pulleys, and each variable conical disc pulley comprises two partly intermeshing cones, one of which is adjustable with respect to the other. The two belt drives are arranged in series, and two of the four variable conical disc pulleys are combined with each other to a duplex variable conical disc pulley forming an intermediate pulley, which is swingably mounted in the casing of the transmission and is controlled by the balancing of the tension in the two wedge-shaped belts. Furthermore, the two wedge-shaped belts are arranged in such a way next to each other, that the driving variable conical disc pulley associated with the shaft of the motor is coaxial to the driven variable conical disc pulley associated with the outgoing-power shaft. For an increase of the number of revolutions of the outgoing-power shaft only the adjustable cone of the driving conical disc pulley associated with the shaft of the motor is displaced; for a decrease of the number of revolutions of the outgoing powershaft only the adjustable cone of the driven conical disc pulley associated with the outgoing-power shaft is displaced. In either case the remaining three variable conical disc pulleys are automatically adjusted by virtue of the balancing of the tension in the two wedge-shaped belts.

As will be understood from above description of the stepless change speed transmission according to the invention, the ratio of the maximal number of revolutions of the driven outgoing-power shaft to the minimal number of revolutions of said shaft is equal to the fourth power of the ratio of the maximal effective diameter of the variable conical disc pulleys to the minimal effective diameter of said pulleys, i. e.:

$$\frac{n_1 \max.}{n_1 \min.} = \left(\frac{D \max.}{D \min.}\right)^4$$

Or: the ratio of the maximal effective diameter of the conical disc pulleys to the minimal effective diameter of said pulleys is equal to the fourth root of the ratio of the maximal number of revolutions of the outgoing-power shaft to the minimal number of revolutions of said shaft, i. e., $$\frac{D \max.}{D \min.} \sqrt[4]{\frac{n_1 \max.}{n_1 \min.}}$$

Figure 4:
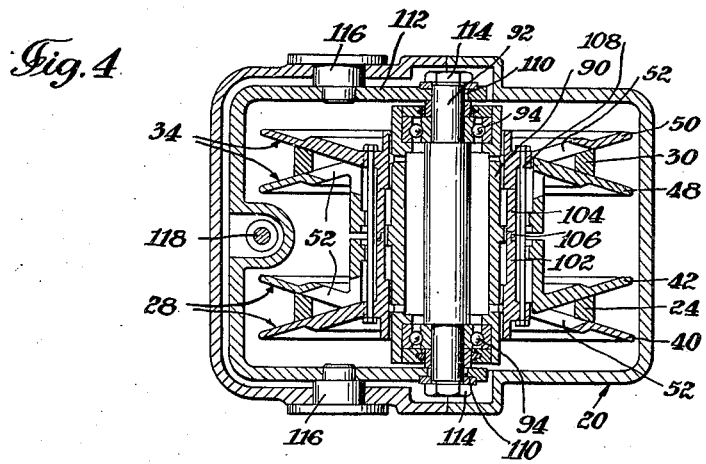

The above mentioned objects and advantages as well as other objects and advantages will be more fully disclosed in the following specification reference being had to the accompanying drawings forming part of this specification, wherein:

Fig. 1 is a longitudinal sectional view of a stepless change speed transmission attached to a driving motor, Fig. 2 is an elevational view of the stepless change speed drive shown in Fig. 1, Fig. 3 is a sectional view of the stepless change speed transmission taken on line 3—3 of Fig. 1, Fig. 4 is a sectional view of the stepless change speed transmission taken on line 4—4 of Fig. 3, Figs. 5 and 6 are diagrammatical views of the belt drives of the transmission illustrating the adjustable cones of the variable conical disc pulleys in a position for a medium number of revolutions of the outgoing-power shaft, Figs. 7 and 8 are diagrammatical views similar to that shown in Figs. 5 and 6, illustrating, however, the adjustable cones in a position for a maximal number of revolutions of the outgoing-power shaft, and, Figs. 9 and 10 are diagrammatical views similar to those shown in Figs. 5 and 6, illustrating, however, the adjustable cones in a position for a minimal number of revolutions of the outgoing-power shaft.

Referring now to Figs. 1–4, 20 generally indicates a stepless change speed transmission attached to an electromotor 22. The unit 20, 22 forms a stepless change speed drive, which may be used for driving a machine, for example a lathe, at various speeds.

24 indicates a first wedge-shaped belt trained around two variable conical disc pulleys generally indicated by 26 and 28. 30 indicates a second wedge-shaped belt trained around two variable conical disc pulleys generally indicated by 32 and 34.

Each variable conical disc pulley comprises a pair of oppositely disposed cones of cast iron, steel, light metal or the like; the pulley 26 comprises the cones 36 and 38, the pulley 28 comprises the cones 40 and 42, the pulley 32 comprises the cones 44 and 46, and the pulley 34 comprises the cones 48 and 50. The conical faces of all cones are at the same angle of such a degree that they properly fit the bevelled faces of the wedge-shaped belts.

In the embodiment of the transmission shown in the drawings, the cones 36, 38, 40, 42, 44, 46, 48 and 50 are provided with radial openings 52 for an intermeshing of two oppositely disposed cones. These radial openings, however, may be omitted, if only slight variations in the number of revolutions are desired, as the ratio of the maximal effective diameter of the conical disc pulleys to the minimal effective diameter of said pulleys is very small owing to the arrangement in series of the two belt drives, and as, consequently, only a slight displacement of the adjustable cones in the direction of their axes is required for a variation in the number of revolutions. Furthermore, the radial openings may also be omitted, if variations in the number of revolutions of larger degree are desired, provided, however, that the belts used are of somewhat greater width.

The cone 36 is secured to the shaft 54 of the motor 22 in such manner that it cannot be moved in the direction of its axis. The shaft 54 is the incoming-power shaft. The cone 36 and the oppositely disposed cone 38 form in combination with each other the driving conical disc pulley 26 of the transmission. The right hand end of the hub 56 of the cone 38 is rotatably arranged in an axially movable controlling sleeve 58 by means of a conical roller bearing 60; the left hand end of said hub 56 is slidably arranged in the hub 62 of the cone 36. Thus, the cone 38 may be axially displaced toward the axially immovable cone 36 by means of the axially movable controlling sleeve 58, when the latter is moved in left hand direction as viewed in Fig. 1. The cone 38, however, is not positively controlled by the sleeve 58 for a separation from the cone 36, when the sleeve 58 is moved in right hand direction, as the conical roller bearing 60 provides for a certain relative movement between the sleeve 58 and the cone 38 under these circumstances.

An equal pair of cones 44 and 46 forming the driven conical disc pulley 32 is arranged on the right hand side of the axially movable controlling sleeve 58. The cone 46 is secured to the outgoing-power shaft 64 in such a manner that it cannot be moved in the direction of its axis. The left-hand end of the hub 66 of the cone 44 is rotatably arranged in the axially movable controlling sleeve 58 by means of a conical roller bearing 68; the right hand end of the hub 66 is slidably arranged in the hub 70 of the cone 46. Thus, the cone 44 may be axially displaced toward the axially immovable cone 46 by means of the axially movable controlling sleeve 58, when the latter is moved in right hand direction as viewed in Fig. 1. The cone 44, however, is not positively controlled by the sleeve 58 for a separation from the cone 46, when the sleeve 58 is moved in left hand direction, as the conical roller bearing 68 provides for a certain relative movement between the sleeve 58 and the cone 44 under these circumstances.

A grooved roller 72 keyed to the outgoing-power shaft 64 may be connected with the machine to be driven (not shown) by a plurality of belts.

The controlling sleeve 58 coaxially arranged with both the shaft 54 and the shaft 64 is axially movable in the member 74 connected with the casing of the transmission by a rib 76. The controlling sleeve 58 carries a rack 78 in mesh with a pinion 80 secured to a rotatable rod 82. As best shown in Fig. 3, a portion of the rack 78 is in engagement with walls of the member 74 so as to prevent the sleeve 58 from a rotation. A control handle 84 secured to one end of the rod 82 serves to rotate said rod for an axial displacement of the controlling sleeve 58 in either direction by means of the pinion 80 and rack 78.

There is only a small force necessary for the displacement of the controlling sleeve 58, as the axial thrusts exerted on the cones 38 and 44 by the tension of the belts 24 and 30 act against each other. A "Ferrodo"-disc 86 and a spring 88 cause a braking effect on the rod 82 for preventing an undesired displacement of the controlling sleeve 58.

The variable conical disc pulleys 28 and 34 mounted on a hub 90 are combined with each other to a duplex variable conical disc pulley forming an intermediate pulley swingably arranged in the casing of the transmission and controlled by the balancing of the tension in the two wedge-shaped belts 24 and 30 as will be described hereinafter.

The hub 90 is rotatably mounted on a supporting shaft or countershaft 92 by means of ball bearings 94, which contact abutments on the hub and prevent the hub from a movement in axial direction. The hub 90 is provided with six radial extensions 96, and each of the cones 42 and 48 has six lugs 98. Said lugs 98 are secured to said extensions 96 by means of rivets 100, so that the cones 42 and 48 form an axially immovable double-cone.

The cones 40 and 50 are axially movable on the hub 90 and are provided with projections 102 and 104 extending into the spaces between the extensions 96 of the hub 90 as best shown in Figs. 3 and 4. The projections 102 and 104 are in centering engagement with each other at 106. The cones 40 and 50 are connected with each other by bolts 108, so that these two cones form a unit axially movable on the hub 90.

The supporting shaft or countershaft 92 carrying the intermediate duplex variable conical disc pulley 28, 34, 90 is inserted into slots 110 of a support 112 and fixed to said support by means of nuts 114. The support 112 is swingably mounted on studs 116 secured to the casing of the transmission.

The two wedge-shaped belts 24 and 30 may be put under tension by means of an adjusting screw 118. A spherical portion 120 of said screw abuts against a hemispherical portion 122 of the swingable support 112 carrying the conical disc pulleys 28 and 34, and the end 124 of the screw is threaded into the eccentric rod 126 arranged on the eccentric sheave 128 secured to the rod 82. In order to prevent an excessive tensioning of the belts, the head 130 of the screw 118 is constructed as a friction clutch.

The distance between the axis of the supporting shaft or countershaft 92 and the axis of the shafts 54 and 64 varies slightly in dependence on the adjustment of the number of revolutions. The maximal distance prevails when the movable cones of the transmission are in the intermediate position for a medium number of revolutions as shown in Figures 1, 3 and 4. When the movable cones are moved in either direction from said intermediate position for an increase or a decrease of the number of revolutions, the distance is reduced. It has been found that in a transmission constructed as shown in the drawings for a variation in the number of revolutions at a ratio of 1:8 said reduction of the distance amounts to about 4 mm. The variation in the distance between the axes is positively controlled by the eccentric sheave 128 secured to the rod 82. Figs. 2 and 3 illustrate the adjustable portions of the transmission in the intermediate position for a medium number of revolutions. If the handle 84 secured to the rod 82 is turned in either direction for an increase or a decrease of the number of revolutions, the eccentric sheave 128 secured to the rod 82 is also turned and moved out of its dead center position, so that the eccentric rod 126 and the adjusting screw 118 are moved in the direction of the arrow A. This movement of the adjusting screw 118 permits a swinging movement of the support 112 about the studs 116 through a certain angle necessary for maintaining the tension in the belts by a reduction of the distance between the axis of the shaft 92 and the axis of the shafts 54 and 64.

A spring 132 arranged between the eccentric rod 126 and an abutment 134 projecting from the casing of the transmission relieves the eccentric from the stress of the belts exerted on the adjusting screw 118, so that the controlling of the adjustable parts of the transmission is facilitated and an undesired rotation of the rod 82 and pinion 80 is prevented.

The setting of the transmission may be read off on the dial 136 rotatably arranged on the disc 86. The dial 136 may be moved independently from the handle 84.

As best shown in Fig. 2, the dial 136 is provided with an outer logarithmical scale division 138 indicating various cutting speeds. Furthermore, the dial 136 has an inner geometrical scale division 140 indicating the diameter of the piece of work corresponding to the cutting speed and number of revolutions.

In order to set the transmission, first the dial 136 is rotated to such an extent, that a division of the scale 138 indicating the desired cutting speed is opposite the stationary pointer 142 fixed to the casing of the transmisson. Then, the necessary number of revolutions is obtained by rotating the handle 84 to such an extent that its pointer 144 is opposite a division of the scale 140 indicating the diameter of the piece of work to be turned.

Thus, the number of revolutions is directly set by adjusting the controlling handle 84 to the diameter of the piece of work to be turned, and the operator does not need to carry out calculations or to use tables. Furthermore, the operator may ascertain at once, whether or not it is necessary to operate with a reduction of the speed.

On the other hand, if the operator has set a certain cutting speed according to his own judgment, the set cutting speed may be easily read off on the dial 136 by turning same to such an extent, that the division on the scale 140 indicating the diameter of the piece of work is opposite the pointer 144 of the handle 84.

It has been found that a dial of above described type is also of great help, when the stepless change speed transmission is used for driving a boring machine.

OPERATION OF THE TRANSMISSION

Reference is had to Figs. 5–10. These figures diagrammatically illustrate the variable conical disc pulleys 26, 28, 32 and 34 with the wedge-shaped belts 24 and 30 of the transmission in various positions for various numbers of revolutions of the outgoing-power shaft 64, Figs. 5 and 6 illustrate the adjustable parts of the transmission in an intermediate position for a medium number of revolutions of the shaft 64, Figs. 7 and 8 illustrate these parts in an extreme position for a maximal number of revolutions of the shaft 64 and Figs. 9 and 10 illustrate the same parts in another extreme position for a minimal number of revolutions of the shaft 64.

In Figs. 6, 8 and 10, the axially immovable cones 36, 42, 46 and 48 are shown in full lines, and the axially movable cones 38, 40, 44 and 50 are shown in dash lines. The device for the tensioning of the belts is omitted in Figs. 5–10, but it is understood, that the belts 24 and 30 are put under tension.

*Figs. 5 and 6.—Medium number of revolutions*

The controlling handle 84 is in the intermediate position. The effective radii $R_1$, $R_2$, $R_3$, $R_4$ of the four variable conical disc pulleys 26, 28, 32, 34 are equal to each other, i. e., $$R_1 = R_2 = R_3 = R_4$$

Therefore, the number $n_1$ of revolutions of the outgoing-power shaft 64 is equal to the number $n$ of revolutions of the incoming-power shaft 54, i. e., $$n_1 = n_2$$

*Figs. 7 and 8—Increase of the number of revolutions*

If, during the operation of the transmission, the controlling handle 84 is moved from its intermediate position to the left (as viewed in Fig. 6) into the position shown in Fig. 8, the cone 38 is displaced by the controlling sleeve 58 toward the axially immovable cone 36 secured to the incoming-power shaft 54 (shaft of the motor) into the position shown in Fig. 8.

The above described displacement of the cone 38 forces the portion of the belt 24 between the cones 36 and 38 radially outward, whereby the tension in the belt 24 is increased. Owing to said increase of the tension in the belt 24, the cone 40 of the intermediate duplex variable conical disc pulley 28, 34 is immediately urged to the left (as viewed in Fig. 6) away from the axially immovable cone 42 into the position shown in Fig. 8 so as to permit the portion of the belt 24 between the cones 40 and 42 to come radially inward closer to the axis. At the same time, the cone 50 connected with the cone 40 is moved by the cone 40 to the left toward the axially immovable cone 48 into the position shown in Fig. 8, whereby the portion of the belt 30 between the cones 48 and 50 is forced radially outward and the tension in the belt 30 is increased.

As the cone 46 secured to the outgoing-power shaft 64 is axially immovable, the increase of the tension in the belt 30 causes a movement of the cone 44 to the left into the position shown in Fig. 8, wherein it is at the same distance from the cone 38 as in the position for medium number of revolutions; said displacement of the cone 44 permits the portion of the belt 30 between the cones 44 and 46 to come radially inward closer to the axis.

Thus, the above described balancing of the tension in the two wedge-shaped belts 24 and 30 causes an absolutely automatic adjustment of the intermediate duplex variable conical disc pulley 28, 34 and the variable conical disc pulley 32 coupled with the outgoing-power shaft 64.

As the two belts 24 and 30 are of equal length, and as the eight cones 36, 38, 40, 42, 44, 46, 48, 50 are equally conical, the effective radius $R_1$ of the cones 36 and 38 is equal to the effective radius $R_3$ of the cones 48 and 50, and the effective radius $R_2$ of the cones 40 and 42 is equal to the effective radius $R_4$ of the cones 44 and 46, i. e., $$R_1 = R_3 \text{ and } R_2 = R_4$$

Furthermore, the effective radius $R_1$ of the cones 36 and 38 is larger than the effective radius $R_2$ of the cones 40 and 42, i. e.:

$$R_1 > R_2$$

Therefore:

$$n_1 = n \cdot \left(\frac{R_1}{R_2}\right)^2$$

and $n_1 n$, i. e. the number $n_1$ of revolutions of the outgoing-power shaft 64 is larger than the number $n$ of revolutions of the incoming-power shaft 54.

*Figs. 9 and 10—Decrease of the number of revolutions*

If, during the operation of the transmission, the controlling handle 84 is moved from its intermediate position to the right (as viewed in Fig. 6), the controlling sleeve 58 displaces the cone 44 toward the axially immovable cone 46 secured to the outgoing-power shaft 64 into the position shown in Fig. 10.

The above described displacement of the cone 44 forces the portion of the belt 30 between the cones 44 and 46 radially outward, whereby the tension in the belt 30 is increased. Owing to said increase of the tension in the belt 30, the cone 50 of the intermediate duplex variable conical disc pulley 28, 34 is immediately urged to the right (as viewed in Fig. 6) away from the axially immovable cone 40 into the position shown in Fig. 10 so as to permit the portion of the belt 30 between the cones 40 and 50 to come radially inward closer to the axis. At the same time, the cone 40 connected with the cone 50 is moved by the cone 50 to the right toward the axially immovable cone 42 into the position shown in Fig. 10, whereby the portion of the belt 24 between the cones 40 and 42 is forced radially outward and the tension in the belt 24 is increased.

As the cone 36 secured to the incoming-power shaft 54 is axially immovable, the increase of the tension in the belt 24 causes a movement of the cone 38 to the right into the position shown in Fig. 10, wherein it is at the same distance from the cone 44 as in the position for medium number of revolutions; said displacement of the cone 38 permits the portion of the belt 24 between the cones 36 and 38 to come radially inward closer to the axis.

Thus, the above described balancing of the tension in the two wedge-shaped belts 24 and 30 causes an automatic adjustment of the intermediate duplex variable conical disc pulley 28, 34 and the variable conical disc pulley 26 coupled with the incoming-power shaft 54.

Again the effective radius $R_1$ of the cones 36 and 38 is equal to the effective radius $R_3$ of the cones 48 and 50, and the effective radius $R_2$ of the cones 40 and 42 is equal to the effective radius $R_4$ of the cones 44 and 46, i. e.:

$$R_1 = R_3 \text{ and } R_2 = R_4$$

But, now the effective radius $R_1$ of the cones 36 and 38 is smaller than the effective radius $R_2$ of the cones 40 and 42, i. e.:

$$R_1 < R_2$$

Therefore:

$$n_1 = n \cdot \left(\frac{R_1}{R_2}\right)^2$$

and $n_1 < n$, i. e. the number $n_1$ of revolutions of the outgoing-power shaft 64 is smaller than the number $n$ of revolutions of the incoming-power shaft 54.

As will be obvious from above description of the increase and decrease of the number of revolutions, $$R_1 \text{ max.} = R_2 \text{ max. and } R_1 \text{ min.} = R_2 \text{ min.}$$

Furthermore:

$$n_1 \text{ max.} = n \cdot \left(\frac{R_1 \text{ max.}}{R^2 \text{ min.}}\right)^2 = n \left(\frac{R_1 \text{ max.}}{R_1 \text{ min.}}\right)^2$$

$$n_1 \text{ min.} = n \cdot \left(\frac{R_1 \text{ min.}}{R^2 \text{ max.}}\right)^2 = n \left(\frac{R_1 \text{ min.}}{R_1 \text{ max.}}\right)^2$$

Consequently:

$$\frac{n_1 \text{ max.}}{n_1 \text{ min.}} = \left(\frac{R_1 \text{ max.}}{R_1 \text{ min.}}\right)^4$$

and:

$$\frac{R_1 \text{ max.}}{R_1 \text{ min.}} = \sqrt[4]{\frac{n_1 \text{ max.}}{n_1 \text{ min.}}}$$

Or, if D max. indicates the maximal effective diameter of the cones forming the pulleys and D min. indicates the minimal effective diameter of said cones:

$$\frac{n_1 \text{ max.}}{n_1 \text{ min.}} = \left(\frac{D \text{ max.}}{D \text{ min.}}\right)^4$$

i. e., the ratio of the maximal number of revolutions of the outgoing-power shaft 64, to the minimal number of revolutions of said shaft is equal to the fourth power of the ratio of the maximal effective diameter of the variable conical disc pulleys 26, 28, 32, 34 to the minimal effective diameter of said pulleys. Or:

$$\frac{D \text{ max.}}{D \text{ min.}} = \sqrt[4]{\frac{n_1 \text{ max.}}{n_1 \text{ min.}}}$$

i. e., the ratio of the maximal effective diameter of the variable conical disc pulleys 26, 28, 32, 34 to the minimal effective diameter of said pulleys is equal to the fourth root of the ratio of the maximal number of revolutions of the outgoing-power shaft 64 to the minimal number of revolutions of said shaft.

Essential advantages of the stepless change speed transmissions are the follows:

A great ratio of the number of revolutions of the incoming-power shaft to the number of revolutions of the outgoing-power shaft may be obtained by means of comparatively small reductions of the speed by the individual belt drives; this feature results in favorable working radii and angles of contact of the belts with the conical disc pulleys.

The transmission has a compact construction, so that it may be readily attached to the machine to be driven.

Conventional belts of standard width may be used for the transmission.

The belts may be operated at high speeds.

The belts are at any time, even if they are greatly elongated, under the proper tension without a variation in the effective diameters of the conical disc pulleys or an influence on the number of revolutions.

The transmission has a simple control mechanism without the use of a linkage.

The transmission may be operated in any position it may be put in.

If the transmission is used for the drive of a lathe, a boring machine or the like, it may be immediately set to the desired cutting speed without any calculation or the use of tables.

In the embodiment shown in the drawings, the incoming-power shaft 54 is formed by the shaft of the driving motor 22. Of course, the incoming-power shaft could be a separate shaft forming a part of the transmission; in such a case the separate shaft of the transmission would be coupled with the shaft of an electromotor or any other driving means in any suitable manner.

I have described a preferred embodiment of my invention, but it is clear that numerous changes and omissions may be made without departing from the spirit of my invention.

What I claim is:

1. A stepless change speed transmission comprising a rotatable incoming-power shaft, a rotatable outgoing-power shaft, four rotatable variable conical disc pulleys, each variable conical disc pulley including an auxiliary immovable and an axially movable cone, the first of said pulleys being associated with said incoming-power shaft, the axially movable and the axially immovable cones of the second and third of said pulleys being connected with each other so as to form an intermediate duplex variable conical disc pulley, a countershaft carrying said intermediate duplex pulley, the fourth of said pulleys being associated with said outgoing-power shaft, a supporting member carrying said countershaft, said supporting member being swingably arranged for a variation in the distance between the axis of the countershaft and the axes of the incoming-power shaft and outgoing-power shaft, a first wedge-shaped belt trained around said first and second pulleys, a second wedge-shaped belt trained around said third and fourth pulleys, controlling means associated with the axially movable cones of the first and fourth pulleys for a positive displacement of at least one of said movable cones for a change in the number of revolutions of the outgoing-power shaft, and connecting means associated with said supporting member and with said controlling means, said connecting means being arranged for holding said supporting member in an intermediate position with a predetermined distance between the axis of the countershaft and the axes of the incoming-power and outgoing-power shafts when the movable cones of the pulleys are in an intermediate position for a medium number of revolutions of the outgoing-power shaft, and said connecting means being arranged for a positive displacement of said swingable supporting member for a reduction of said distance simultaneously with a positive displacement of a movable cone of the first and fourth pulleys by said controlling means from its intermediate position.

2. A stepless change speed transmission comprising a rotatable incoming-power shaft, a rotatable outgoing-power shaft, four rotatable variable conical disc pulleys, each variable conical disc pulley including an axially immovable and an axially movable cone, the first of said pulleys being associated with said incoming-power shaft, the axially movable and the axially immovable cones of the second and third of said pulleys being connected with each other so as to form an intermediate duplex variable conical disc pulley, a countershaft carrying said intermediate duplex pulley, the fourth of said pulleys being associated with said outgoing-power shaft, a supporting member carrying said countershaft, said supporting member being swingably arranged for a variation in the distance between the axis of the countershaft and the axes of the incoming-power shaft and outgoing-power shaft, a first wedge-shaped belt trained around said first and second pulleys, a second wedge-shaped belt trained around said third and fourth pulleys, controlling means associated with the axially movable cones of the first and fourth pulleys for a positive displacement of at least one of said movable cones for a change in the number of revolutions of the outgoing-power shaft, and connecting means associated with said supporting member and with said controlling means, said connecting means being arranged for holding said supporting member in an intermediate position with a predetermined distance between the axis of the countershaft and the axes of the incoming-power and outgoing-power shafts when the movable cones of the pulleys are in an intermediate position for a medium number of revolutions of the outgoing-power shaft, said connecting means being arranged for a positive displacement of said swingable supporting member for a reduction of said distance simultaneously with a positive displacement of a movable cone of the first and fourth pulleys by said controlling means from its intermediate position, and said connecting means including adjusting means for an adjustment of said predetermined distance.

3. A stepless change speed transmission comprising a rotatable incoming-power shaft, a rotatable outgoing-power shaft, four rotatable variable conical disc pulleys, each variable conical disc pulley including an axially immovable and an axially movable cone, the first of said pulleys being associated with said incoming-power shaft, the axially movable and the axially immovable cones of the second and third of said pulleys being connected with each other so as to form an intermediate duplex variable conical disc pulley, a countershaft carrying said intermediate duplex pulley, the fourth of said pulleys being associated with said outgoing-power shaft, a supporting member carrying said countershaft, said supporting member being swingably arranged for a variation in the distance between the axis of the countershaft and the axes of the incoming-power shaft and outgoing-power shaft, a first wedge-shaped belt trained around said first and second pulleys, a second wedge-shaped belt trained around said third and fourth pulleys, controlling means associated with the axially movable cones of the first and fourth pulleys for a positive displacement of at least one of said movable cones for a change in the number of revolutions of the outgoing-power shaft, movable connecting means connected with said supporting member, and cam means connected with said controlling means and associated with said connecting means for a positive movement of said connecting means, said connecting means being arranged for holding said supporting member in an intermediate position with a predetermined distance between the axis of the countershaft and the axes of the incoming-power and outgoing-power shafts when the movable cones of the pulleys are in an intermediate position for a medium number of revolutions of the outgoing-power shaft, and said connecting means being arranged for a positive displacement of said swingable supporting member for a reduction of said distance simultaneously with a positive displacement of a movable cone of the first and fourth pulleys by said controlling means from its intermediate position.

4. A stepless change speed transmission comprising a rotatable incoming-power shaft, a rotatable outgoing-power shaft, four rotatable variable conical disc pulleys, each variable conical disc pulley including an axially immovable and an axially movable cone, the first of said pulleys being associated with said incoming-power shaft, the axially movable and the axially immovable cones of the second and third of said pulleys being connected with each other so as to form an intermediate duplex variable conical disc pulley, a countershaft carrying said intermediate duplex pulley, the fourth of said pulleys being associated with said outgoing-power shaft, a supporting member carrying said countershaft, said supporting member being swingably arranged for a variation in the distance between the axis of the countershaft and the axes of the incoming-power shaft and outgoing-power shaft, a first wedge-shaped belt trained around said first and second pulleys, a second wedge-shaped belt trained around said third and fourth pulleys, controlling means associated with the axially movable cones of the first and fourth pulleys for a positive displacement of at least one of said movable cones for a change in the number of revolutions of the outgoing-power shaft, movable connecting means connected with said supporting member, and cam means connected with said controlling means and associated with said connecting means for a positive movement of said connecting means, said connecting means being arranged for holding said supporting member in an intermediate position with a predetermined distance between the axis of the countershaft and the axes of the incoming-power and outgoing-power shafts when the movable cones of the pulleys are in an intermediate position for a medium number of revolutions of the outgoing-power shaft, said connecting means being arranged for a positive displacement of said swingable supporting member for a reduction of said distance simultaneously with a positive displacement of a movable cone of the first and fourth pulleys by said controlling means from its intermediate position, and said connecting means including adjusting means for an adjustment of said predetermined distance.

5. A stepless change speed transmission comprising a rotatable incoming-power shaft, a rotatable outgoing-power shaft, four rotatable variable conical disc pulleys, each variable conical disc pulley including an axially immovable and an axially movable cone, the first of said pulleys being associated with said incoming-power shaft, the axially movable and the axially immovable cones of the second and third of said pulleys being connected with each other so as to form an intermediate duplex variable conical disc pulley, a countershaft carrying said intermediate duplex pulley, the fourth of said pulleys being associated with said outgoing-power shaft, a supporting member carrying said countershaft, said supporting member being swingably arranged for a variation in the distance between the axis of the countershaft and the axes of the incoming-power shaft and outgoing-power shaft, a first wedge-shaped belt trained around said first and second pulleys, a second wedge-shaped belt trained around said third and fourth pulleys, controlling means for displacing the axially movable cone of the first pulley for an increase of the number of revolutions of the outgoing-power shaft and for displacing the axially movable cone of the fourth pulley for a decrease of the number of revolutions of said outgoing-power shaft, coupling means between said controlling means and the movable cones of the first and fourth pulleys for a positive movement of the movable cone in the direction toward the immovable cone of its pulley by the controlling means, said coupling means permitting a relative movement between the movable cone and the controlling means in opposite direction, and connecting means associated with said supporting member and with said controlling means, said connecting means being arranged for holding said supporting member in an intermediate position with a predetermined distance between the axis of the countershaft and the axes of the incoming-power and outgoing-power shafts when the movable cones of the pulleys are in an intermediate position for a medium number of revolutions of the outgoing-power shaft, and said connecting means being arranged for a positive displacement of said swingable supporting member for a reduction of said distance simultaneously with a positive displacement of a movable cone of the first and fourth pulleys by said controlling means from its intermediate position.

6. A stepless change speed transmission comprising a rotatable incoming-power shaft, a rotatable outgoing-power shaft, four rotatable variable conical disc pulleys, each variable conical disc pulley including an axially immovable and an axially movable cone, the first of said pulleys being associated with said incoming-power shaft, the axially movable and the axially immovable cones of the second and third of said pulleys being connected with each other so as to form an intermediate duplex variable conical disc pulley, a countershaft carrying said intermediate duplex pulley, the fourth of said pulleys being associated with said outgoing-power shaft, a supporting member carrying said countershaft, said supporting member being swingably arranged for a variation in the distance between the axis of the countershaft and the axes of the incoming-power shaft and outgoing-power shaft, a first wedge-shaped belt trained around said first and second pulleys, a second wedge-shaped belt trained around said third and fourth pulleys, controlling means for displacing the axially movable cone of the first pulley for an increase of the number of revolutions of the outgoing-power shaft and for displacing the axially movable cone of the fourth pulley for a decrease of the number of revolutions of said outgoing-power shaft, coupling means between said controlling means and the movable cones of the first and fourth pulleys for a positive movement of the movable cone in the direction toward the immovable cone of its pulley by the controlling means, said coupling means permitting a relative movement between the movable cone and the controlling means in opposite direction, and conecting means associated with said supporting member and with said controlling means, said conecting means being arranged for holding said supporting member in an intermediate position with a predetermined distance between the axis of the countershaft and the axes of the incoming-power and outgoing-power shafts when the movable cones of the pulleys are in an intermediate position for a medium number of revolutions of the outgoing-power shaft, said connecting means being arranged for a positive displacement of said swingable supporting member for a reduction of said distance simultaneously with a positive displacement of a movable cone of the first and fourth pulleys by said controlling means from its intermediate position, and said connecting means including adjusting means for an adjustment of said predetermined distance.

7. A stepless change speed drive comprising a driving device, a rotatable incoming-power shaft in said driving device, a rotatable outgoing-power shaft, four rotatable variable conical disc pulleys, each variable conical disc pulley including an axially immovable and an axially movable cone, the first of said pulleys being associated with said incoming-power shaft, the axially movable and the axially immovable cones of the second and third of said pulleys being connected with each other so as to form an intermediate duplex variable conical disc pulley, a countershaft carrying said intermediate duplex pulley, the fourth of said pulleys being associated with said outgoing-power shaft, a supporting member carrying said countershaft, said supporting member being swingably arranged for a variation in the distance between the axis of the countershaft and the axes of the incoming-power shaft and outgoing-power shaft, a first wedge-shaped belt trained around said first and second pulleys, a second wedge-shaped belt trained around said third and fourth pulleys, controlling means associated with the axially movable cones of the first and fourth pulleys for a positive displacement of at least one of said movable cones for a change in the number of revolutions of the outgoing-power shaft, and connecting means associated with said supporting member and with said controlling means, said connecting means being arranged for holding said supporting member in an intermediate position with a predetermined distance between the axis of the countershaft and the axes of the incoming-power and outgoing-power shafts when the movable cones of the pulleys are in an intermediate position for a medium number of revolutions of the outgoing-power shaft, and said connecting means being arranged for a positive displacement of said swingable supporting member for a reduction of said distance simultaneously with a positive displacement of a movable cone of the first and fourth pulleys by said controlling means from its intermediate position.

8. A stepless change speed drive comprising a driving device, a rotatable incoming-power shaft in said driving device, a rotatable outgoing-power shaft, four rotatable variable conical disc pulleys, each variable conical disc pulley including an axially immovable and an axially movable cone, the first of said pulleys being associated with said incoming-power shaft, the axially movable and the axially immovable cones of the second and third of said pulleys being connected with each other so as to form an intermediate duplex variable conical disc pulley, a countershaft carrying said intermediate duplex pulley, the fourth of said pulleys being associated with said outgoing-power shaft, a supporting member carrying said countershaft, said supporting member being swingably arranged for a variation in the distance between the axis of the countershaft and the axes of the incoming-power shaft and outgoing-power shaft, a first wedge-shaped belt trained around said first and second pulleys, a second wedge-shaped belt trained around said third and fourth pulleys, controlling means associated with the axially movable cones of the first and fourth pulleys for a positive displacement of at least one of said movable cones for a change in the number of revolutions of the outgoing-power shaft, and connecting means associated with said supporting member and with said controlling means, said connecting means being arranged for holding said supporting member in an intermediate position with a predetermined distance between the axis of the countershaft and the axes of the incoming-power and outgoing-power shafts when the movable cones of the pulleys are in an intermediate position for a medium number of revolutions of the outgoing-power shaft, said connecting means being arranged for a positive displacement of said swingable supporting member for a reduction of said distance simultaneously with a positive displacement of a movable cone of the first and fourth pulleys by said controlling means from its intermediate position, and said connecting means including adjusting means for an adjustment of said predetermined distance.

9. A stepless change speed drive comprising a driving device, a rotatable incoming-power shaft in said driving device, a rotatable outgoing-power shaft, four rotatable variable conical disc pulleys, each variable conical disc pulley including an axially immovable and an axially movable cone, the first of said pulleys being associated with said incoming-power shaft, the axially movable and the axially immovable cones of the second and third of said pulleys being connected with each other so as to form an intermediate duplex variable conical disc pulley, a countershaft carrying said intermediate duplex pulley, the fourth of said pulleys being associated with said outgoing-power shaft, a supporting member carrying said countershaft, said supporting member being swingably arranged for a variation in the distance between the axis of the countershaft and the axes of the incoming-power shaft and outgoing-power shaft, a first wedge-shaped belt trained around said first and second pulleys, a second wedge-shaped belt trained around said third and fourth pulleys, controlling means associated with the axially movable cones of the first and fourth pulleys for a positive displacement of at least one of said movable cones for a change in the number of revolutions of the outgoing-power shaft, and cam means connected with said controlling means and associated with said connecting means for a positive movement of said connecting means, said connecting means being arranged for holding said supporting member in an intermediate position with a predetermined distance between the axis of the countershaft and the axes of the incoming-power and outgoing-power shafts when the movable cones of the pulleys are in an intermediate position for a medium number of revolutions of the outgoing-power shaft, and said connecting means being arranged for a positive displacement of said swingable supporting member for a reduction of said distance simultaneously with a positive displacement of a movable cone of the first and fourth pulleys by said controlling means from its intermediate position.

WALTER VOEGELI.